US009868812B2

(12) United States Patent
Wu et al.

(10) Patent No.: US 9,868,812 B2
(45) Date of Patent: Jan. 16, 2018

(54) MECHANO-RESPONSIVE COMPOSITION

(71) Applicant: Henkel AG & Co. KGaA, Duesseldorf (DE)

(72) Inventors: Haiping Wu, Shanghai (CN); Jingfen Zhang, Shanghai (CN); Rainer Schoenfeld, Duesseldorf (DE); Thomas Bachon, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 15/011,934

(22) Filed: Feb. 1, 2016

(65) Prior Publication Data
US 2016/0168314 A1    Jun. 16, 2016

Related U.S. Application Data

(63) Continuation of application No. PCT/CN2013/081272, filed on Aug. 12, 2013.

(51) Int. Cl.
*C08G 59/68* (2006.01)
*C08G 59/28* (2006.01)
(Continued)

(52) U.S. Cl.
CPC ......... *C08G 59/28* (2013.01); *C08G 59/3227* (2013.01); *C08G 59/66* (2013.01); *C08G 59/686* (2013.01); *C08K 5/00* (2013.01)

(58) Field of Classification Search
CPC .......... C08G 59/22; C08G 59/02; C08L 63/00
See application file for complete search history.

(56) References Cited

U.S. PATENT DOCUMENTS 7,242,443 B2    7/2007 Sage et al.
7,244,500 B2    7/2007 Watts et al.
(Continued)

FOREIGN PATENT DOCUMENTS

CN    102648230    8/2012
JP    S59175482    10/1984
(Continued)

OTHER PUBLICATIONS

Valgin et al., Vysokomolekulyarnye Soedineniya, Seriya B: Kratkie, Soobshcheniya (1971), 13(1), 6-7.*
(Continued)

*Primary Examiner* — Shane Fang
(74) *Attorney, Agent, or Firm* — Steven C. Bauman

(57) ABSTRACT

The present invention provides a two-part mechano-responsive composition, comprising: Part I: a tetra-glycidyl amine multifunctional epoxy resin represented by the general formula (I);

Formula (I)

and Part II: a polythiol and an amine. The cured composition has a mechano-responsive property without adding any dyes or luminescence agents, and by subjected to mechanical stimuli, the cured composition changes its color, and the color is in the visible spectrum range, which can be easily checked with naked eyes; and the color change is reversible.

12 Claims, 1 Drawing Sheet

(51) Int. Cl.
*C08G 59/66* (2006.01)
*C08G 59/32* (2006.01)
*C08K 5/00* (2006.01)

(56) References Cited

U.S. PATENT DOCUMENTS

| | | | |
|---|---|---|---|
| 8,236,914 B2 | 8/2012 | Potisek et al. | |
| 8,703,844 B2 | 4/2014 | Burckhardt et al. | |
| 2012/0270967 A1* | 10/2012 | Burckhardt | C08G 59/4042 523/400 |
| 2014/0303286 A1 | 10/2014 | Li et al. | |

FOREIGN PATENT DOCUMENTS

| | | |
|---|---|---|
| JP | H0267390 | 3/1990 |
| JP | H04204529 | 7/1992 |
| JP | H055021 | 1/1993 |
| JP | H055095 | 1/1993 |
| JP | H07165881 | 6/1995 |
| JP | 2001226459 | 8/2001 |
| JP | 2002509178 | 3/2002 |
| JP | 2002284860 | 10/2002 |
| JP | 2004231974 | 8/2004 |
| JP | 2008088212 | 4/2008 |
| JP | 2011162691 | 8/2011 |
| JP | 103184022 | 7/2013 |
| JP | 103189412 | 7/2013 |
| JP | 2013253194 | 12/2013 |
| JP | 2014500895 | 1/2014 |
| WO | 99036484 | 7/1999 |
| WO | 2006105290 | 10/2006 |
| WO | 2007002883 | 1/2007 |
| WO | 2012059558 | 5/2012 |
| WO | 2013002685 | 1/2013 |

OTHER PUBLICATIONS

International Search Report issued in connection with International Patent Application No. PCT/CN2013/081272 dated May 23, 2014.

\* cited by examiner

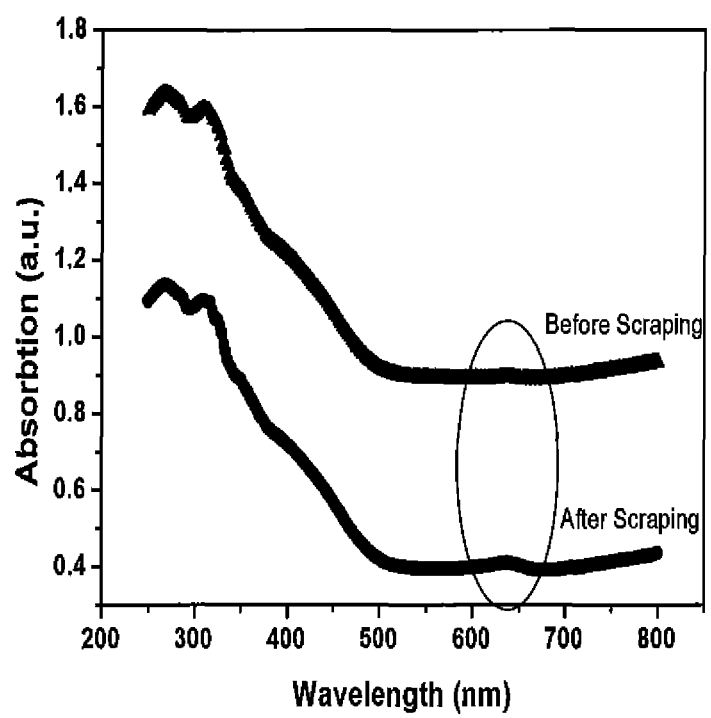

MECHANO-RESPONSIVE COMPOSITION

TECHNICAL FIELD

The present invention relates to a mechano-responsive composition capable of changing colour when subjected to mechanical stimuli.

BACKGROUND

Polymer materials are ubiquitous in everyday life and are used in various applications (such as, medicals, automobiles, electronics, structures, etc.). These materials experience stress during the normal use, which can lead to damage and failure of the product. Having the ability of detecting damage and locating areas under high stress in situ is essential to eliminating failure of the polymer materials.

Mechano-responsive luminescent materials change the colour of their luminescence isothermally, and because these changes can be easily detected, they have potential use for practical applications such as mechano-sensors, indicators of mechano-history, security papers, opto-electronic devices and data storage. For example, deformation, distortion and destruction of various materials can be detected more easily through mechanochromic luminescent materials than using traditional methods. These sensing properties can also be useful for the maintenance of materials because they can easily show where the damage has occurred.

The simplest manner to provide a mechanochromic material is to incorporate a coloured substance into the matrix in the form of capsules or hollow fibers, as described in WO2007/003883A1. Initially, the colour is not visible. Upon damage to the matrix, the capsules or fibers rupture and expose the coloured substance, such as a fluid or solid. WO2006/105290A2 discloses a two-part system, wherein a colourless compound is mixed with an activator. Upon the rupture of their respective containers, a colour change is trigged. A disadvantage of these systems is that the fibers and capsules need to be evenly dispersed throughout the matrix, so that the damage inducing force has a large chance to intersect the capsules or fibers.

U.S. Pat. No. 7,242,443B2 discloses another approach, wherein triboluminescent materials are used to give off flashes of light in response to stress or damage. When damage occurs, these materials require continuous monitoring to detect due to the transient nature of the light flash.

U.S. Pat. No. 7,244,500B2 discloses smart coatings consisting of several layers of sensing materials. These coatings are complex and require external power to accomplish many of their tasks.

U.S. Pat. No. 8,236,914B2 discloses a self-assessing mechanochromic material, which is a mechanochromic material including a polymer having a backbone containing a mechanophore.

Nallicheri, et al. ("*Investigations of the Mechanochromic Behavior of Poly(urethane-diacetylene) Segmented Copolymers*", Macromolecules, 1991, pp. 517-525, Vol. 24, No. 2) discloses a diacetylene segmented copolymer, which exhibits a shift of colour when subjected to a strain.

Todres ("*Recent advances in the study of mechanochromic transitions of organic compounds*", J. of Chemical Research, 2004, 89-93) outlines several organic compounds possessing mechanochromic properties. Specifically, spiropyran has been noted to undergo a colour change upon grinding. However, few applications exist for the small molecule alone. Weder and coworkers (Weder, C. Mechanochemistry: Polymers react to stress. Nature 459, 45-46 (2009)) have incorporated cyano-substituted oligo(p-phenylene vinylene) derivatives into different polymer matrixes and have synthesized "self-assessing" polyurethanes, polyethylene blends, poly(ethylene terephthalate)s, and poly (ethylene terephthalate glycol)s. Their approach relies on the initial formation of nanoscale aggregates of the sensor molecules in the polymer matrix. Upon deformation, the cyano-substituted oligo(p-phenylene vinylene) sensors are transformed from excimer to monomer and a shift in the emission spectrum is observed. Most of these sensing units are not chemically incorporated into the backbone, and exhibit only a fluorescent colour change that is not visible to the naked eye. Additionally, these materials are not reversible in colour change and can only exhibit a colour change once.

Kim and Reneker ("*A mechanochromic smart material*", Polymer Bulletin, 31, 1993, 367-374) introduced azobenzene into a copolyamide oligomer, which was chemically incorporated into a polyurethane. Upon exposing the material to tensile stress, a change in the UV spectrum at 375 nm was observed. However, no visible change was noted and the polymer had to be irradiated with UV light prior to stressing the materials.

In the recent patent document WO 2009018111 A1, David and his coworkers presented a mechanochromic material comprising a polymer having a backbone containing a mechanophore, which is used as an additive to get colour change under mechano-force.

The number of mechano-responsive luminescent materials based on molecular assemblies is still limited, compared with that of dynamic luminescent materials responding to heat or light.

In most of the reported mechanochromic materials, an additive having a mechanochromic property, such as, a dye or a luminescence agent, was used as luminescence resource in the polymer matrix.

The problem to be solved by the present invention is to provide a mechanochromic material which has mechanochromic properties without the need of an additional mechanochromic component, such as a dye or a luminescence agent. It should be a simple system with only a few components so that the production and use are simplified. Additionally, it would be beneficial that the response to mechanical stimuli could be observed within the visible light spectrum. Preferably, the mechanochromic material should be able to recover so that its mechanochromic response is reversible and the material can be used longer and indicates several mechanical stimuli.

SUMMARY OF THE INVENTION

In the present invention, a two-part composition is provided having mechano-responsive property without adding any dyes or luminescence agents, and by subjected to mechanical stimuli, the cured composition changes its colour, and the colour is in the visible spectrum range, which can be easily checked with naked eyes; and the colour change is reversible.

In one aspect, the present invention provides a two-part mechano-responsive composition, comprising:

Part I: a tetra-glycidyl amine multifunctional epoxy resin represented by the general formula (I); and Part II: a polythiol and as catalyst an amine;

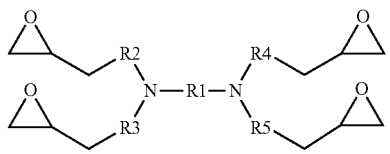

Formula (I)

wherein,

R1 represents a linear or branched, unsubstituted or substituted alkylene group having 1 to 10 carbon atoms, an unsubstituted or substituted arylene group having 6 to 20 carbon atoms, or a combination of the alkylene and the arylene.

R2, R3, R4 and R5, independently each other, represent a direct bond, a linear or branched, unsubstituted or substituted alkylene group having 1 to 10 carbon atoms, an unsubstituted or substituted arylene group having 6 to 20 carbon atoms, or a combination of the alkylene and the arylene.

More than 50% of the polythiol carries at least three thiol groups (—SH) per molecule.

The amine is a catalyst for epoxy-thiol curing systems. Preferred is a tertiary amine.

Another aspect of the present invention is to provide a process for producing a mechano-responsive material using the composition of the present invention, comprising: blending the tetra-glycidyl amine multifunctional epoxy resin, the polythiol, the amine and optional additives together, and curing the mixture to obtain the mechano-responsive material.

Still another aspect of the present invention is to provide a mechano-responsive material produced by using the composition of the present invention.

Still another aspect of the present invention is the use of the two-part composition, comprising, as Part I, a tetra-glycidyl amine multifunctional epoxy resin represented by the general formula (I) and, as part II, a polythiol and as catalyst an amine, to produce a cured mechano-responsive material.

Advantages of the present invention are that no dyes or luminescence agents need to be added into the composition, and the colour change of the cured composition derives from the formed structure; meanwhile, the colour change is reversible and is in the visible spectrum range, which can be checked with naked eyes.

BRIEF INTRODUCTION OF THE DRAWINGS

FIG. 1 is a graph of the absorption spectrum of the cured composition of the present invention before and after applying an outside force, measured by a UV-Vis spectrophotometer.

DETAILED DESCRIPTION OF THE INVENTION

The present invention will be described in details as followings. The materials, methods, and examples herein are illustrative only and, except as specifically stated, are not intended to be limiting. Although methods and materials similar or equivalent to those described herein can be used in the practice or testing of the present invention, suitable methods and materials are described herein.

All publications and other references mentioned herein are explicitly incorporated by reference in their entirety.

Unless otherwise defined, all technical and scientific terms used herein have the same meanings as commonly understood by those skilled in the art. In case of conflict, the present specification, including definitions, will control.

Unless stated otherwise, all percentages, parts, ratios, etc., are by weight.

Where a range of numerical values are recited herein, unless otherwise stated, the range is intended to include the endpoints thereof, and all integers and fractions within the range.

Use of "a" or "an" is employed to describe elements and components of the present invention. This is done merely for convenience and to give a general sense of the invention. This description should be read to include one or at least one and the singular also includes the plural unless it is obvious that it is meant otherwise.

Other than in the operating examples, or where otherwise indicated, all numbers expressing quantities of ingredients, reaction conditions, or defining ingredient parameters used herein are to be understood as modified in all instances by the term "about".

The terms "mechano-responsive (luminescent) material", "mechanochromic (luminescent) material" used in the context all refer to those materials capable of changing colour when subjected to mechanical stimuli, and can be used interchangeably.

As mentioned above, one aspect of the present invention is to provide a two-part mechano-responsive composition, comprising: Part I: a tetra-glycidyl amine multifunctional epoxy resin represented by the general formula (I); and Part II: a polythiol and as catalyst an amine.

Each component in the composition of the present invention will be described in detail as below.

Part I: Tetra-Glycidyl Amine Multifunctional Epoxy Resin

The tetra-glycidyl amine multifunctional epoxy resin used in the present invention has a structure of the general formula (I):

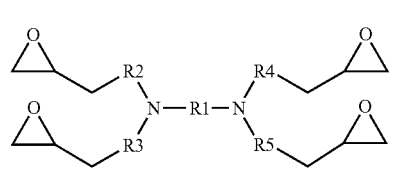

Formula (I)

wherein,

R1 represents a linear or branched, unsubstituted or substituted alkylene group having 1 to 10 carbon atoms, an unsubstituted or substituted arylene group having 6 to 20 carbon atoms, or a combination of the alkylene and the arylene.

Examples of the substitutent on the alkylene include an aryl group having 6 to 20 carbon atoms, for example, phenyl and biphenyl.

When R1 represents an alkylene, preference is given to a linear or branched, unsubstituted alkylene group having 1, 2, 3, 4, 5, 6, 7, 8, 9 or 10 carbon atoms, such as, methylene, ethylene, propylene, butylene, amylene, hexylene, heptylene, octylene, nonylene, decylene, and all isomers of them.

Examples of the substitutent on the arylene include an alkyl group having 1 to 10 carbon atoms, i.e., having 1, 2, 3, 4, 5, 6, 7, 8, 9 or 10 carbon atoms, such as, methyl, ethyl, propyl, butyl, amyl, hexyl, heptyl, octyl, nonyl, decyl, and all isomers of them.

When R1 represents an arylene group, preference is given to an unsubstituted arylene having 6 to 20 carbon atoms, such as, phenylene, biphenylene or phenylene-biphenylene.

When defining the carbon atom number of a group in the context, the defined number does not include the carbon atoms of the substituent(s). For example, the expression "alkylene having 1 to 10 carbon atoms" only define the carbon atom number of the alkylene. However, as for the branched alkylene or alkyl, the carbon atoms in the branches are included in the defined carbon atom number. For example, the groups —CH$_2$CH$_2$CH$_2$CH$_2$—, —CH(CH$_3$)CH$_2$CH$_2$—, —CH(CH$_2$CH$_3$)CH$_2$— and —CH(CH$_2$(CH$_3$)$_2$)— all belong to "an alkylene having 4 carbon atoms", and the group —CH(phenyl)CH$_2$— belongs to "an alkylene having 2 carbon atoms substituted with a phenyl".

From the point view of practical use, in order to ensure heat resistance of the cured composition, it is preferred that R1 contains at least one arylene group in the backbone. For example, the alkylene and the arylene may present alternately in the backbone of group R1, in such a manner, one or more, for example, two or three or four, alkylene groups and one or more, for example, two or three or four, arylene groups may be included.

When R1 represents a combination of the alkylene and the arylene, especially, the alkylene and the arylene present alternately in the backbone of group R1, R1 may have a structure selected from the following formulae, for example:

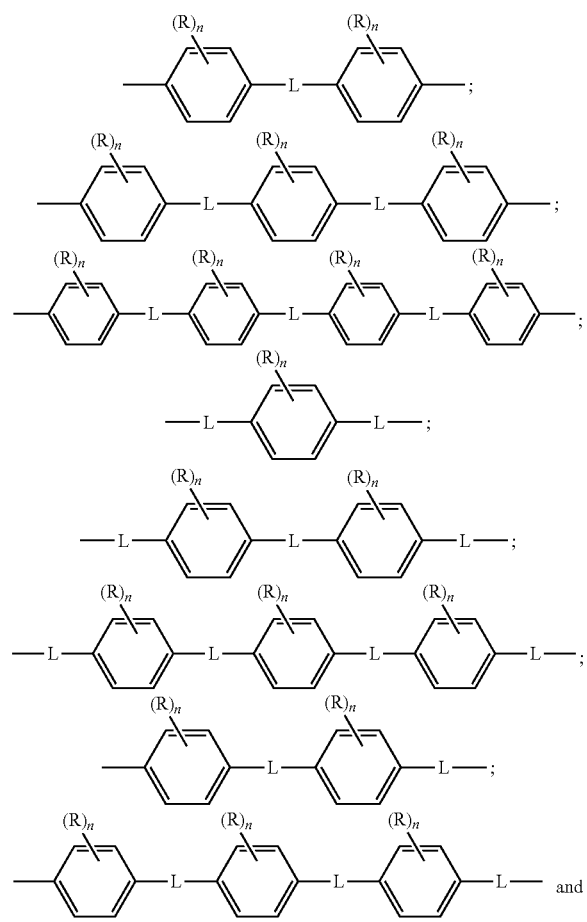

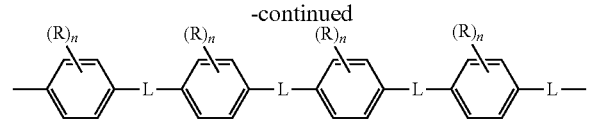

wherein,

L in each occurrence independently represents a linear or branched alkylene group having 1 to 10 carbon atoms, i.e., having 1, 2, 3, 4, 5, 6, 7, 8, 9 or 10 carbon atoms, such as, methylene, ethylene, propylene, butylene, amylene, hexylene, heptylene, octylene, nonylene, decylene, and all isomers of them; preferably, a linear or branched alkylene group having 1, 2, 3, 4 or 5 carbon atoms, such as, methylene, ethylene, propylene, butylene or amylene;

R in each occurrence independently represents an alkyl group having 1 to 10 carbon atoms, i.e., having 1, 2, 3, 4, 5, 6, 7, 8, 9 or 10 carbon atoms, such as, methyl, ethyl, propyl, butyl, amyl, hexyl, heptyl, octyl, nonyl, decyl, and all isomers of them, or an aryl group having 6 to 20 carbon atoms, for example, phenyl and biphenyl; preferably, an alkyl group having 1, 2 or 3 carbon atoms, such as, methyl, ethyl or propyl; and n in each occurrence independently is an integer of 0 to 4, such as, 0, 1, 2, 3 or 4, preferably, 0 or 1, more preferably, 0.

From the view point of practical use, most preferred structure for R1 in the present invention is:

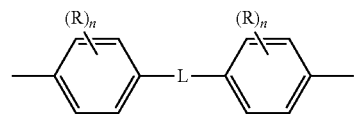

wherein L, R and n have the same meanings as defined above.

R2, R3, R4 and R5, independently each other, represent a direct bond, a linear or branched, unsubstituted or substituted alkylene group having 1 to 10 carbon atoms, an unsubstituted or substituted arylene group having 6 to 20 carbon atoms, or a combination of the alkylene and the arylene.

Preferably, R2, R3, R4 and R5, independently each other, represent a direct bond, or a linear or branched alkylene group having 1, 2, 3, 4, 5, 6, 7, 8, 9 or 10 carbon atoms; such as, methylene, ethylene, propylene, butylene, amylene, hexylene, heptylene, octylene, nonylene, decylene, and all isomers of them. More preferably, R2, R3, R4 and R5, independently each other, represent a direct bond, a methylene or an ethylene; most preferably, a direct bond.

The tetra-glycidyl amine multifunctional epoxy resin may be used in the composition of the present invention alone or in a mixture.

The commercially available examples of the tetra-glycidyl amine multifunctional epoxy resin include, but not limited to, LY5056, MY720, MY721, XB9721, MY9512, MY9612, MY9634, MY9655 and MY9663 from Huntsman under the trademark of Araldite®; AG 80 from Shanghai Institute of Organic Synthesis; Jeh 011 from Changshu Jiafa Chemical Company. These resins can be used alone or in combination of any ratio.

Part II: Polythiol

More than 50% of the polythiol carries at least three thiol groups per molecule. The thiol groups may be primary thiol groups or secondary thiol groups or combinations thereof.

The definition "more than 50% of the polythiol carries at least three thiol groups per molecule" in this context may be understood as follows: one or more polythiols may be used in the composition of the present invention; when only one polythiol is used in the invention, the polythiol should comprise at least three thiol groups per molecule; while when more than one polythiol is used in the invention, more than 50% of the polythiol, for example, more than 70%, more than 80%, more than 90%, more than 98%, or 100% of the polythiol should carry at least three thiol groups per molecule, and other polythiol may comprise less than three thiol groups in one molecule. Preferably, 100% of the polythiol carries at least three thiol groups per molecule.

The definition "at least three" in this context may be understood as a number range including 3 and any integers bigger than 3, for example, 3.0 to 10, or 3.0 to 8.0, or 3.0 to 6.0, such as, 3.0, 4.0, 5.0, 6.0 and so on.

Preferred examples of the polythiols used in the present invention include, but not limited to,

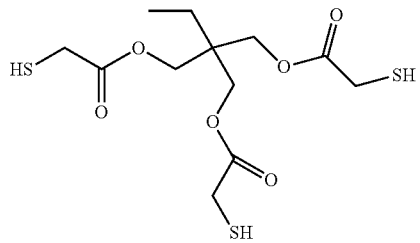

trimethylolpropane tris(thioglycolate), TMTG,
CAS No.: 10193-96-1

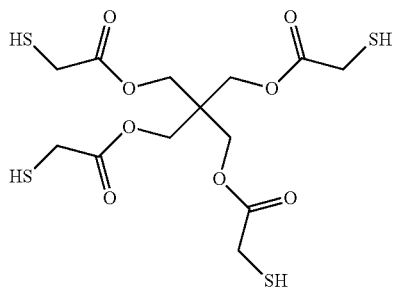

pentaerythritol tetrakis(thioglycolate), PETG,
CAS No.: 10193-99-4

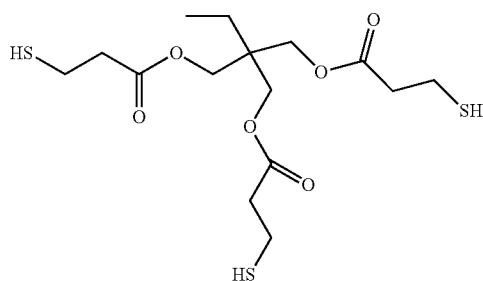

trimethylolpropane tris(3-mercaptopropionate), TMTP,
CAS No.: 33007-83-9

-continued

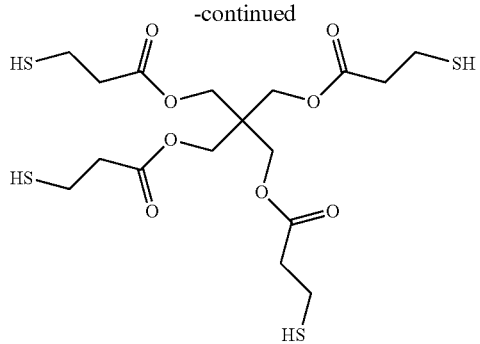

pentaerythritol tetrakis(3-mercaptopropionate), PETP,
CAS No.: 7575-23-7

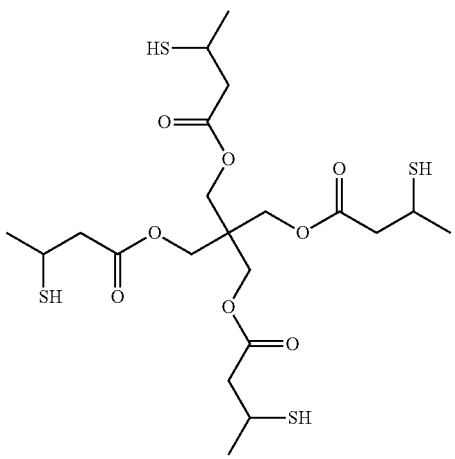

pentaerythritol tetrakis(3-mercaptobutylate), PETB, CAS No.: 31775-89-0
Commercially available from Showdenko under
tradename of KarenzMT PE1

These thiols can be used alone or in combination of any ratio.

To obtain a sufficient curing of the composition and maintain the mechanochromic property, the molar ratio between the epoxy group and the thiol group (—SH) in the composition may be in the range of 1:0.8 to 1:1.4, preferably 1:1.

The amount of the polythiol used in the composition may be adjusted according to the polythiol used and the required properties of the cured material. For example, based on 100 parts by weight of the tetra-glycidyl amine multifunctional epoxy resin, the amount of the polythiol may be 80 to 150 parts by weight, preferably, 120 to 140 parts by weight.

Part II: Amine

The amine is a catalyst for epoxy-thiol curing systems. Preferred is a tertiary amine. The amine can be used alone or in combination of any ratio.

Examples of the amine include trimethylamine, triethylamine, tetraethylmethylenediamine, tetramethylpropane-1, 3-diamine, tetramethylhexane-1,6-diamine, pentamethyldiethylenetriamine, pentamethyldipropylenetriamine, bis(2-dimethylaminoethyl)ether, ethylene glycol(3-dimethyl) aminopropyl ether, dimethylaminoethanol, dimethylaminoethoxyethanol, N,N,N'-trimethylaminoethylethanolamine, dimethylcyclohexylamine, N,N-dimethylaminomethylphenol, N,N-dimethylpropylamine, N,N,N',N'-tetramethylhexamethylenediamine, N-methylpiperidine, N,N'-dimethylpiperazine, N,N-dimethylbenzylamine, dimethylaminomethylphenol, 2,4,6-tris(dimethylaminomethyl) phenol, 1,8-diazabicycloundecene-7, 1,5-diazabicyclononene-5,6-dibutylamino-1,8-diazabicycloundecene-7, 1,2-dimethylimidazole, dimethylpiperazine, N-methyl-N'-(2-dimethylamino)ethylpiperazine, N-methylmorpholine, N—(N',N'-(dimethylamino)ethyl)morpholine, N-methyl-N'-(2-hydroxyethyl)morpholine, triethylenediamine and hexamethylenetetramine. Of these, N,N-dimethylbenzylamine (DMBA), 2,4,6-tris(dimethylaminomethyl)phenol, bis[(dimethylamino)methyl]phenol and mixtures thereof are particularly preferable.

The amount of the amine used in the composition may be adjusted by those skilled in the art according to the practical use. For example, based on 100 parts by weight of the tetra-glycidyl amine multifunctional epoxy resin, the amount of the amine may be 1 to 4 parts by weight, preferably, 2 to 3 parts by weight.

Additives

Besides the components discussed above, the composition of the present invention may comprise any commonly used additives according to actual requirements, for example, diluents such as neopentyl glycol diglycidyl ether (for example, ED 523T from ADEKA), or trimethylolpropane triglycidyl ether (for example, DYT from Huntsman); fillers such as $BaSO_4$, $CaCO_3$ and talc; tougheners such as MX153, MX154 (from KANEKA); pigments; rheological modifiers such as fumed silica (for example, TS 720 from Carbot) and the like.

Another aspect of the present invention is to provide a process for producing a mechano-responsive material using the composition of the present invention, comprising: blending the tetra-glycidyl amine multifunctional epoxy resin, the polythiol, the amine and optional additives together, and curing the mixture to obtain the mechano-responsive material.

The key point of the present invention is the incorporation of the tetra-glycidyl amine multifunctional epoxy resins and the polythiols discussed above into the composition. Other components or curing procedures may be the same as those common epoxy-thiol curing systems. And thus, the blending and the curing can be carried out by any technical means used in the art under suitable conditions that may be adjusted according to actual requirements.

Still another aspect of the present invention is to provide a mechano-responsive material produced by using the composition of the present invention.

Another aspect of the present invention is the use of a two-part composition, comprising, as Part I, a tetra-glycidyl amine multifunctional epoxy resin represented by the general formula (I) and, as part II, a polythiol and as catalyst an amine, to produce a cured mechano-responsive material.

EXAMPLES

The present invention will be further described and illustrated in details with reference to the following examples, which, however, are not intended to restrict the scope of the present invention.

Materials Used in the Examples

DER 331, from Dow chemicals, is a liquid reaction product of epichlorohydrin and bisphenol A.

EPON Resin 828, from Hexion, is an undiluted clear difunctional bisphenol A/epichlorohydrin derived liquid epoxy resin.

MY 721, XB 9721, MY 9512, MY9634, and MY9655, from Huntsman, all of them are tetrafunctional amine epoxy resins.

AG 80, from Shanghai Institute of Organic Synthesis, is a tetrafunctional amine epoxy resin.

Jeh 011, from Changshu Jiafa Chemical Company, is a tetrafunctional amine epoxy resin.

Capcure 3-800, from BASF, is a mixture of mainly bifunctional and minor trifunctional polythiols.

TMTG, PETG, TMTP, PETP, all from KUDO Chemicals, are polythiols having at least three thiol groups.

PE 1, from Showdeno, is PETB, a polythiol having four thiol groups.

Ancamine 2636, from Air Products, is a modified aliphatic amine.

DMBA, from Aldrich, is N,N-dimethylbenzylamine.

DMP-302, from Aldrich, is 4,6-tris(dimethylaminomethyl)phenol.

EH 30, from BASF, is a mixture of 2,4,6-tris-(dimethylaminomethyl)-phenol and bis[(dimethylamino)methyl]phenol.

Examples 1-6 and Comparative Examples CE1-CE4

Examples 1-6 and comparative examples CE1-CE4 were carried out using the components and amounts thereof as listed in table 1. In each case, Components were mixed together by Speedmixer (from THINKY) with 2000 rpm and under 0.2 kPa vacuum. Then, the blended liquid mixture was poured into models with different shapes, such as, dog-borne, round or ball shapes. The curing condition was 3 hours at room temperature, or 5 minutes at 80° C. After curing, yellow-colour products were obtained in all cases.

Mechano-Responsive Property Test

To the obtained products, an outside force, such as scrapping, pressing, stretching or cutting, was applied. Visually check the colour change and the colour recovery. The results are shown in Table 1.

In addition, an absorption spectrum of the cured composition from Example 1 was tested before and after applying an outside force using a UV-Vis spectrophotometer. It can be seen that before applying the outside force, there is no absorption in the wavelength range of the red colour, which is the complementary colour of the green colour; and after applying the outside force, an absorption peak appears in red colour range, which indicates that the green colour appears.

TABLE 1

| Components | | Ex. 1 | Ex. 2 | Ex. 3 | Ex. 4 | Ex. 5 | Ex. 6 | CE. 1 | CE. 2 | CE. 3 | CE. 4 |
|---|---|---|---|---|---|---|---|---|---|---|---|
| Epoxy resin | DER 331 | | | | | | | | | 50 | 100 |
| | EPON 828 | | | | | | | | | 50 | |
| | MY 721 | 100 | | 50 | | | 60 | 100 | 100 | | |
| | XB 9721 | | 100 | | 40 | | | | | | |
| | MY 9512 | | | | 10 | | | | | | |

TABLE 1-continued

| | Components | Ex. 1 | Ex. 2 | Ex. 3 | Ex. 4 | Ex. 5 | Ex. 6 | CE. 1 | CE. 2 | CE. 3 | CE. 4 |
|---|---|---|---|---|---|---|---|---|---|---|---|
| polythiol | MY9634 | | | 50 | | | | | | | |
| | MY9655 | | | | 50 | | | | | | |
| | AG 80 | | | | | 100 | 20 | | | | |
| | Jeh 011 | | | | | | 20 | | | | |
| | Capcure 3800 | | | | | | | 130 | | | |
| | TMTG | | 30 | | | | | | | | |
| | PETG | | | | 20 | | | | | | |
| | TMTP | | | 30 | | | | | | | |
| | PETP | | | | | 40 | | | | | |
| | PE 1 | 120 | 100 | 100 | 110 | 80 | 130 | | | 130 | 120 |
| amine | DMBA | | 2 | 2 | 4 | | 3 | | | | |
| | DMP-30 | 2.5 | | 1.5 | | | | 3 | 3 | 2.5 | 2.5 |
| | EH 30 | | | | | 1.5 | 1 | | | | |
| | Ancamine 2636 | | | | | | | | 130 | | |
| Visible colour change | | Yes | Yes | Yes | Yes | Yes | Yes | No | No | No | No |
| Visible colour recovery | | Yes | Yes | Yes | Yes | Yes | Yes | — | — | — | — |

Notes:
unit for each value is parts by weight.

In Examples 1-6, using components falling in the scope of the present invention, the obtained products changed their colour from yellow to green when subjected to the mechanical stimuli, and the green colour recovered to yellow again by keeping at room temperature for 12 h or heating at 80° C. for 1 h.

In Comparative Examples 1-4 (CE. 1-4), the obtained products do not exhibit colour change when subjected to the mechanical stimuli.

The present invention is illustrated in details in the embodiments; however, it is apparent for those skilled in the art to modify and change the embodiments without deviating from the spirit of the invention. All the modifications and changes should fall in the scope of the appended claims of the present application.

What is claimed is:

1. A two-part mechano-responsive composition, comprising:
   Part I: a tetra-glycidyl amine multifunctional epoxy resin represented by the general formula (I);

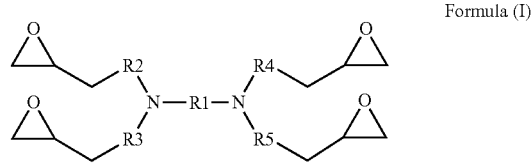

Formula (I)

wherein R1 represents a linear or branched, unsubstituted or substituted alkylene group having 1 to 10 carbon atoms; and
   R2, R3, R4 and R5, independently each other, represent a direct bond, a linear or branched, unsubstituted or substituted alkylene group having 1 to 10 carbon atoms, an unsubstituted or substituted arylene group having 6 to 20 carbon atoms, or a combination of the alkylene and the arylene; and
   Part II: consisting of a polythiol and a tertiary amine catalyst;
   wherein more than 50% of the polythiol carries at least 3 thiol groups per molecule and when cured and subjected to mechanical stimuli, the cured composition changes color.

2. The composition according to claim 1, wherein the alkylene group of R1 is a linear or branched, unsubstituted alkylene group having 1, 2, 3, 4, 5, 6, 7, 8, 9 or 10 carbon atoms.

3. The composition according to claim 1, wherein the arylene group is an unsubstituted phenylene, biphenylene or phenylene-biphenylene.

4. The composition according to claim 1, wherein R1 contains at least one arylene group in the backbone.

5. The composition according to claim 4, wherein the alkylene group and the arylene group present alternately in the backbone of the R1 group.

6. The composition according to claim 5, wherein R1 represents

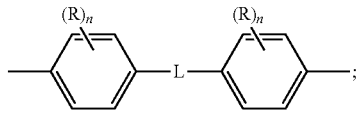

wherein
   L represents a linear or branched alkylene group having 1, 2, 3, 4, 5, 6, 7, 8, 9 or 10 carbon atoms, preferably, a linear or branched alkylene group having 1, 2, 3, 4 or 5 carbon atoms, such as, methylene, ethylene, propylene, butylene or amylene;
   R represents an alkyl group having 1, 2, 3, 4, 5, 6, 7, 8, 9 or 10 carbon atoms, preferably, an alkyl group having 1, 2 or 3 carbon atoms, such as, methyl, ethyl or propyl; and
   n is an integer of 0 to 4, preferably, 0 or 1, more preferably, 0.

7. The composition according to claim 1, wherein R2, R3, R4 and R5, independently from each other, represent a direct bond, or a linear or branched alkylene group having 1, 2, 3, 4, 5, 6, 7, 8, 9 or 10 carbon atoms.

8. The composition according to claim 1, wherein more than 70% of the polythiol carries at least three thiol groups per molecule.

9. The composition according to claim 8, wherein 100% of the polythiol carries at least three thiol groups per molecule.

10. The composition according to claim 1, wherein the polythiol is selected from trimethylolpropane tris(thioglycolate), pentaerythritol tetrakis(thioglycolate), trimethylolpropane tris(3-mercaptopropionate), pentaerythritol tetrakis (3-mercaptopropionate), and pentaerythritol tetrakis(3-mercaptobutylate).

11. The composition according to claim 1, wherein the amine is a tertiary amine.

12. A process for producing a mechano-responsive material using the composition according to claim 1, comprising: blending the tetra-glycidyl amine multifunctional epoxy resin, the polythiol, the amine and optional additives together, and curing the mixture to obtain the mechano-responsive material.

\* \* \* \* \*

UNITED STATES PATENT AND TRADEMARK OFFICE
CERTIFICATE OF CORRECTION

PATENT NO. : 9,868,812 B2
APPLICATION NO. : 15/011934
DATED : January 16, 2018
INVENTOR(S) : Haiping Wu et al.

It is certified that error appears in the above-identified patent and that said Letters Patent is hereby corrected as shown below:

Abstract, Line 9, change "color" to -- colour --.

Abstract, Line 10, change "color" to -- colour --.

Abstract, Line 11, change "color" to -- colour --.

Signed and Sealed this
Twenty-eighth Day of August, 2018

Andrei Iancu
*Director of the United States Patent and Trademark Office*